(12) United States Patent
Ikemura et al.

(10) Patent No.: US 11,458,950 B2
(45) Date of Patent: Oct. 4, 2022

(54) DRIVE FORCE CONTROL SYSTEM FOR HYBRID VEHICLE

(71) Applicant: TOYOTA JIDOSHA KABUSHIKI KAISHA, Aichi (JP)

(72) Inventors: Ryosuke Ikemura, Susono (JP); Naoto Kato, Susono (JP); Takayoshi Kawai, Susono (JP); Teppei Yoshioka, Susono (JP); Hiromasa Hashimoto, Susono (JP); Hiroshi Watanabe, Shizuoka-ken (JP); Yasuhiro Kuze, Numazu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 316 days.

(21) Appl. No.: 16/749,995

(22) Filed: Jan. 23, 2020

(65) Prior Publication Data
US 2020/0247390 A1 Aug. 6, 2020

(30) Foreign Application Priority Data
Jan. 31, 2019 (JP) .............................. JP2019-015310

(51) Int. Cl.
*B60W 20/13* (2016.01)
*B60L 50/64* (2019.01)
(Continued)

(52) U.S. Cl.
CPC ............ *B60W 20/13* (2016.01); *B60L 15/20* (2013.01); *B60L 50/64* (2019.02); *B60W 10/06* (2013.01); *B60W 10/08* (2013.01); *B60W 10/10* (2013.01)

(58) Field of Classification Search
CPC ...... B60W 20/13; B60W 10/06; B60W 10/08; B60W 10/10; B60W 20/11; B60W 30/1882; B60W 2710/0677; B60W 2710/086; B60W 10/11; B60W 10/26; B60W 20/40; B60W 2510/0638; B60W 2510/0657; B60W 2510/0666; B60W 2510/1005; B60W 2510/244; B60W 2520/10; B60L 15/20; B60L 50/64; B60L 58/12; B60L 2220/42; B60L 2240/12; B60L 2240/16; B60L 2240/421; B60L 2240/545;
(Continued)

(56) References Cited

U.S. PATENT DOCUMENTS

2015/0025725 A1   1/2015  Uchida
2017/0008510 A1*  1/2017  Imamura ................ B60K 6/445

FOREIGN PATENT DOCUMENTS

JP    2013244786 A   12/2013
JP    2015-20620 A    2/2015
JP    2018134942 A    8/2018

* cited by examiner

*Primary Examiner* — Brian P Sweeney
(74) *Attorney, Agent, or Firm* — Hauptman Ham, LLP (57) ABSTRACT

A drive force control system configured to reduce a total energy consumption of a hybrid vehicle. The drive force control system calculates: an output power of the engine which can optimize a thermal efficiency given that the engine is operated at a best fuel point; and a required electric power to be supplied from a battery or to be generated by a control motor, which can adjust the drive power established by the output power of the engine to the required power. A power exchange between the control motor and the battery is interrupted if the required electric power to be supplied from the electric storage device or to be generated by the control motor is less than a first predetermined electric power.

8 Claims, 5 Drawing Sheets

(51) Int. Cl.
*B60L 15/20* (2006.01)
*B60W 10/06* (2006.01)
*B60W 10/08* (2006.01)
*B60W 10/10* (2012.01)

(58) Field of Classification Search
CPC ......... B60L 2240/547; B60L 2240/549; B60L 2250/28; B60L 50/16; B60K 6/448; B60K 6/485; Y02T 10/40; Y02T 10/62; Y02T 10/64; Y02T 10/72; Y02T 10/84; Y02T 10/70; Y02T 10/7072; Y02T 10/92
See application file for complete search history.

DRIVE FORCE CONTROL SYSTEM FOR HYBRID VEHICLE

CROSS REFERENCE TO RELATED APPLICATIONS

The present invention claims the benefit of Japanese Patent Application No. 2019-015310 filed on Jan. 31, 2019 with the Japanese Patent Office, the invention of which are incorporated herein by reference in its entirety.

BACKGROUND

Field of the Invention

Embodiments of the present disclosure relate to the art of a drive force control system for a hybrid vehicle provided with at least one of an engine and a motor as a prime mover.

Discussion of the Related Art

JP-A-2015-20620 describes a control method for a hybrid vehicle comprising: a power split device including a first rotary element connected to an engine, a second rotary element connected to a first motor, and a third rotary element connected to an output shaft; a second motor connected to the output shaft; and a transmission to which torque of the output shaft is applied. The hybrid vehicle taught by JP-A-2015-20620 may be powered only by the second motor while stopping the engine and current supply to the first motor to reduce an energy loss. However, a rotational speed of the first motor is increased with an increase in a speed of the vehicle. Consequently, even if the current supply to the first motor is stopped, a counter electromotive force of the first motor is increased to generate electricity. In order to avoid such unintentional power generation, according to the teachings of JP-A-2015-20620, the rotational speed of the first motor is reduced by executing an upshifting of the transmission while stopping the current supply to the first motor, when a state quantity related to the rotational speed of the first motor increases to a prescribed quantity.

That is, according to the teachings of JP-A-2015-20620, an energy consumption of the first motor when the first motor is not required to generate torque is reduced by stopping the current supply to the first motor. In addition, according to the teachings of JP-A-2015-20620, the engine may be operated at a most fuel efficient point by controlling the torque of the first motor when delivering torque of the engine to drive wheels. However, as a result of operating the engine at the most fuel efficient point by controlling the torque of the first motor, an energy loss such as an iron loss and a copper loss of the first motor 4 is increased. In this situation, the energy loss resulting from driving the first motor may exceed a reduction in the energy consumption resulting from operating the engine at the most fuel efficient point. As a result, a total energy consumption of the vehicle may be increased.

SUMMARY

Aspects of embodiments of the present disclosure have been conceived noting the foregoing technical problems, and it is therefore an object of the present disclosure to provide a drive force control system configured to reduce a total energy consumption of a hybrid vehicle.

The drive force control system according to the exemplary embodiment of the present invention is applied to a hybrid vehicle having: an engine; a transmission connected to an output section of the engine, in which a gear stage is selected from a plurality of gear stages; a control motor having a generating function that is connected to any one of a pair of wheels to which a torque is delivered from the transmission and another pair of wheels; and an electric storage device that is connected to the control motor. In order to achieve the above-explained objective, the drive force control system is provided with a controller that controls the engine and the control motor. Specifically, the controller is configured to: calculate an output power of the engine which can optimize a thermal efficiency of the engine given that the engine is operated at a speed determined based on a speed ratio of the transmission and a speed of the hybrid vehicle; calculate a required electric power to be supplied from the electric storage device or to be generated by the control motor, which can adjust a drive power to propel the hybrid vehicle established by the calculated output power of the engine to a required power to propel the vehicle; and interrupt power exchange between the control motor and the electric storage device if the required electric power to be supplied from the electric storage device or to be generated by the control motor is equal to or less than a first predetermined electric power.

In a non-limiting embodiment, the first predetermined electric power may be set to a value at which an energy loss of the control motor resulting from supplying the required electric power from the electric storage device to the control motor or generating the required electric power by the control motor is increased greater than an energy loss resulting from operating the engine to generate the output power to achieve the drive power to propel the hybrid vehicle.

In a non-limiting embodiment, the controller may be further configured to: reduce the required electric power to be supplied from the electric storage device or to be generated by the control motor at a predetermined reduction rate, if the required electric power to be supplied from the electric storage device or to be generated by the control motor is equal to or less than the first predetermined electric power; and interrupt the power exchange between the control motor and the electric storage device by reducing the required electric power to be supplied from the electric storage device or to be generated by the control motor to zero, after the required electric power to be supplied from the electric storage device or to be generated by the control motor is reduced to be equal to or less than a second predetermined electric power.

In a non-limiting embodiment, the hybrid vehicle may comprise a first motor connected to an input section of the transmission, and a second motor connected to an output section of the transmission or to said another pair of wheels, and the controller may be further configured to select any one of the first motor and the second motor as the control motor.

In a non-limiting embodiment, the controller may be further configured to: select the first motor as the control motor in a case that the required drive power to propel the hybrid vehicle is less than the output power of the engine; and select the second motor as the control motor in a case that the required drive power to propel the hybrid vehicle is greater than the output power of the engine.

In a non-limiting embodiment, the controller may be further configured to calculate a first power loss as a total value of: an electrical power loss as might be caused by supplying the required electric power to the first motor from the electric storage device or generating the required electric power by the first motor; and a mechanical power loss as might be caused by delivering a mechanical power generated by the first motor to the pair of wheels to which a torque is delivered from the transmission. In addition, the controller may be further configured to calculate a second power loss as a total value of: an electrical power loss as might be caused by supplying the required electric power to the second motor from the electric storage device or generating the required electric power by the second motor; and a mechanical power loss as might be caused by delivering a mechanical power generated by the second motor to any one of the pair of wheels and said another pair of wheels to which a torque is delivered from the second motor. Further, the controller may be further configured to select the first motor as the control motor in a case that the first power loss is less than the second power loss, and select the second motor as the control motor in a case that the first power loss is greater than the second power loss.

In a non-limiting embodiment, the controller may be further configured to interrupt the power exchange between the other one of the first motor and the second motor and the electric storage device, irrespective of whether the power is exchanged between the control motor and the electric storage device.

In a non-limiting embodiment, the controller may be further configured to inhibit interruption of the power exchange between the second motor and the electric storage device, in a case that the electric power generated by the second motor is greater than a third predetermined electric power.

Thus, the drive force control system according to the exemplary embodiment of the present disclosure calculates: the output power of the engine which can optimize a thermal efficiency of the engine given that the engine is operated at a speed determined based on a gear stage of the transmission and a vehicle speed; and the required electric power to be supplied from the electric storage device or to be generated by the control motor, which can adjust the drive power to propel the vehicle established by the output power of the engine to the required power to propel the vehicle. According to the exemplary embodiment of the present disclosure, the power exchange between the control motor and the electric storage device is interrupted if the required electric power to be supplied from the electric storage device or to be generated by the control motor is equal to or less than the first predetermined electric power. That is, in a case that the required electric power to be supplied from the electric storage device or to be generated by the control motor is low, the control motor is shut-down. In other words, the control motor is stopped in a case that an expected reduction effect of energy consumption by generating a power slightly by the control motor is insufficient. According to the exemplary embodiment of the present disclosure, therefore, an energy loss as might be caused by exchanging the electric power between the electric storage device and the control motor to operate the control motor will not be caused. For this reason, a total energy efficiency in the hybrid vehicle may be improved.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
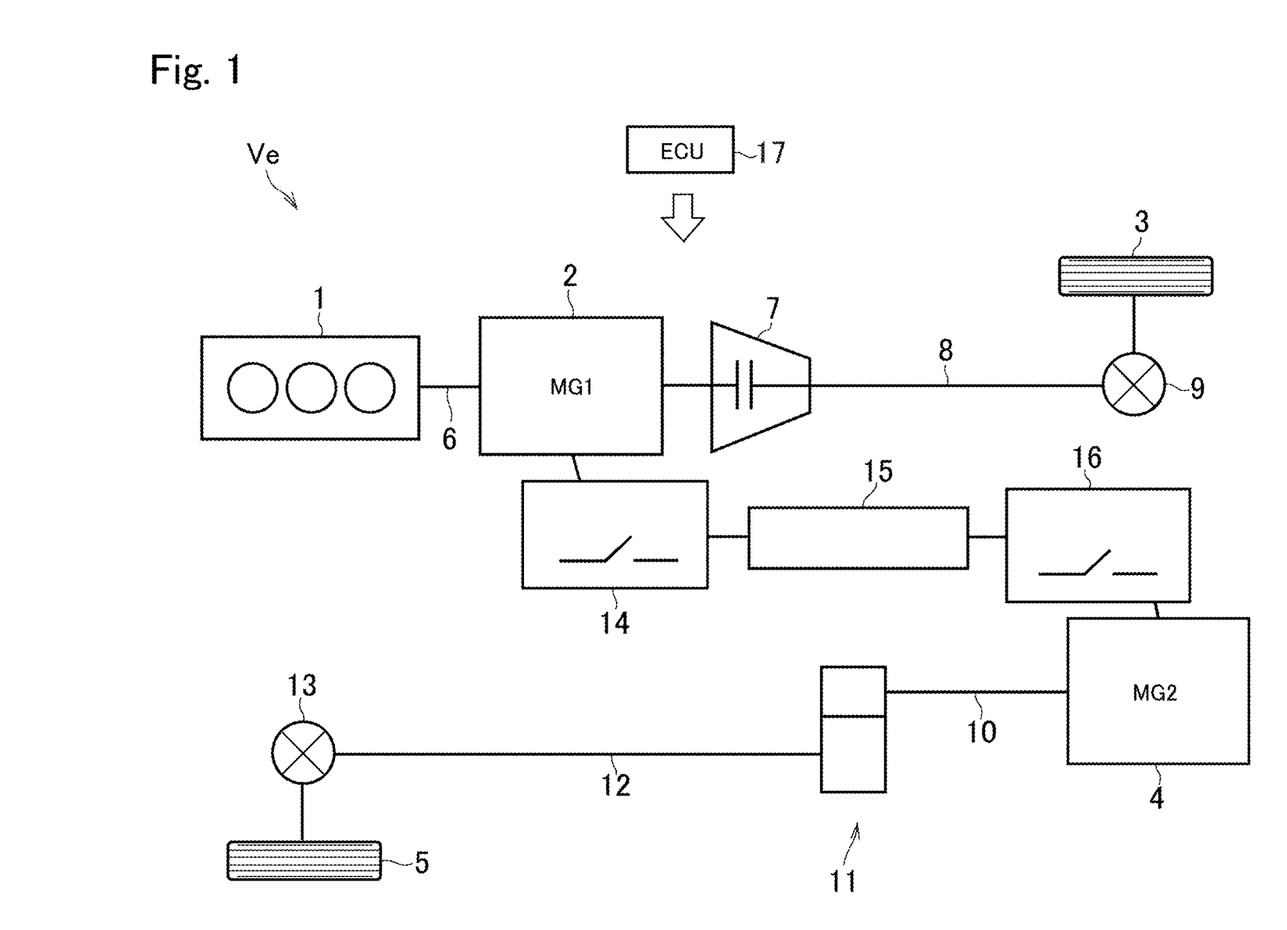
FIG. 1 is a schematic illustration showing one example of a structure of a hybrid vehicle to which the control system according to the embodiment of the present invention is applied.

Embodiments of the present disclosure will now be explained with reference to the accompanying drawings. Turning now to FIG. 1, there is shown a structure of a hybrid vehicle (as will be simply called the "vehicle" hereinafter) Ve. In the vehicle Ve, a prime mover includes an engine (referred to as "ENG" in the drawings) 1 and a first motor (referred to as "MG1" in the drawings) 2, and the engine 1 and the first motor 2 are connected to a pair of rear wheels 3 respectively. On the other hand, a second motor (referred to as "MG2" in the drawings) 4 serving as another prime mover is connected to a pair of front wheels 5.

For example, an internal combustion engine that generate power by burning an air/fuel mixture such as a gasoline engine and a diesel engine may be adopted as the engine 1. Specifically, an operating point of the engine 1 is governed by a speed and an output torque of the engine 1, and the air/fuel mixture is burnt in the engine 1 to generate power at a thermal efficiency governed in accordance with the operating point.

Specifically, an output shaft 6 of the engine 1 is connected to a rotor shaft of the first motor 2 so that the rotor shaft of the first motor 2 is rotated integrally with the output shaft 6 of the engine 1. For example, as a conventional hybrid vehicle and an electric vehicle, a permanent magnet synchronous motor having a generating function may be adopted as the first motor 2. The first motor 2 is configured to generate a larger torque within a low-speed range to enhance generating function as compared to the second motor 4.

The output shaft 6 of the engine 1 penetrates through the first motor 2 so that a leading end of output shaft 6 is joined to a transmission 7. For example, a geared transmission in which a speed ratio is changed stepwise may be adopted as the transmission 7.

An output shaft (not shown) of the transmission 7 is connected to the pair of rear wheels 3 through a rear propeller shaft 8 and a rear differential gear unit 9. In FIG. 1, only one of the rear wheels 3 is depicted for the sake of illustration.

The second motor 4 is disposed at a center of the vehicle Ve in the longitudinal direction or at a rear section of the vehicle Ve. The permanent magnet synchronous motor having a generating function may be adopted as the second motor 4. Specifically, the second motor 4 is configured to generate a smaller torque within a high-speed range to enhance a motor function as compared to the first motor 2.

An output shaft 10 of the second motor 4 extends toward the front section of the vehicle Ve to be connected to a front propeller shaft 12 through a reduction gear pair 11, and the front propeller shaft 12 is connected to the pair of front wheels 5 through a front differential gear unit 13. In FIG. 1, only one of the front wheels 5 is depicted for the sake of illustration.

The first motor 2 is connected to an electric storage device 15 comprising a battery and a capacitor through a first inverter 14, and the second motor 4 is connected to the electric storage device 15 through a second inverter 16. The first inverter 14 comprises six pairs of a transistor and a diode coupled individually in an antiparallel manner, and each two pairs of the transistor and the diode are connected individually to a U-phase, a V-phase, and a W-phase of the first motor 2. Likewise, the second inverter 16 also comprises six pairs of a transistor and a diode coupled individually in an antiparallel manner, and each two pairs of the transistor and the diode are connected individually to a U-phase, a V-phase, and a W-phase of the second motor 4. Direct current electricity outputted from the electric storage device 15 is supplied to the first motor 2 and the second motor 4 while being converted into alternating current electricity of predetermined frequency by the first inverter 14 and the second inverter 16. By contrast, alternating current electricity generated by the first motor 2 and the second motor 4 is accumulated in the electric storage device 15 while being converted into direct current electricity by the first inverter 14 and the second inverter 16.

Power exchange between the electric storage device 15 and the first motor 2 or the second motor 4 is interrupted by shutting down the first inverter 14 and the second inverter 16, that is, by stopping switching of the first inverter 14 and the second inverter 16. In this situation, the first motor 2 or the second motor 4 generate neither drive torque nor regenerative torque.

The vehicle Ve is provided with an electronic control unit (to be abbreviated as the "ECU" hereinafter) 17 as a controller to control the engine 1, the first motor 2, the second motor 4, the first inverter 14, the second inverter 16, the transmission 7 and so on. The ECU 17 comprises a microcomputer as its main constituent, and the ECU 17 calculates command signals to be transmitted to the above-mentioned devices based on the incident signals and formulas as well as maps installed in the ECU 17. For example, the ECU 17 receives detection signals of a position of an accelerator pedal (not shown) detected by an accelerator sensor, a speed of the vehicle Ve detected by a vehicle speed sensor, speeds of the first motor 2 and the second motor 4 detected by motor speed sensors, a state of charge level (to be abbreviated as "SOC" hereinafter) of the electric storage device 15, a temperature of the electric storage device 15, an output voltage from the electric storage device 15, an output current from the electric storage device 15 and so on. The map installed in the ECU 17 includes: a drive force map for determining a required drive force based on a speed of the vehicle Ve and a position of the accelerator pedal; a shift map for determining a gear stage of the transmission 7 based on a required drive force and a speed of the vehicle Ve; a thermal efficiency map for determining a thermal efficiency with respect to the operating point of the engine 1; and an energy efficiency map for determining an energy efficiency (i.e., an output power with respect to an input electric power) with respect to an operating point of each of the first motor 2 and the second motor 4.

In principle, in a case of propelling the vehicle Ve by a drive torque of the engine 1, the operating point of the engine 1 is adjusted to a point at which the thermal efficiency can be optimized (i.e., to the most fuel efficient point). In this case, the first motor 2 and the second motor 4 generate drive powers in accordance with an energy difference Pd between a required power Preq to propel the vehicle Ve and an output power (as will be called the "engine power" hereinafter) Pe of the engine 1 generated in accordance with the operating point. Otherwise, the first motor 2 and the second motor 4 translate the engine power Pe partially into an electric power.

In the case of propelling the vehicle Ve by the drive torque of the engine 1, specifically, a required drive force Freq is calculated based on a vehicle speed V and a position of the accelerator pedal with reference to the drive force map, and a gear stage of the transmission 7 is selected based on the required drive force Freq and the vehicle speed V with reference to the shift map. Then, a target engine speed Ne_tag is calculated based on a speed ratio of the selected gear stage of the transmission 7 and the vehicle speed V, and a target engine torque Te_tag to optimize the thermal efficiency based on the target engine speed Ne_tag with reference to the thermal efficiency map. Then, the required power Preq to propel the vehicle Ve is calculated based on the vehicle speed V and the required drive force Freq. Thereafter, the energy difference Pd is calculated by subtracting the engine power Pe as a product of the target engine speed Ne_tag and the target engine torque Te_tag from the required power Preq. If the engine power Pe is less than the required power Preq, the first motor 2 and the second motor 4 generate drive powers in accordance with the energy difference Pd so as to compensate for the shortfall of the drive power. By contrast, if the engine power Pe is less than the required power Preq, the first motor 2 and the second motor 4 translate an excess engine power Pe into the electric power.

Figure 2:
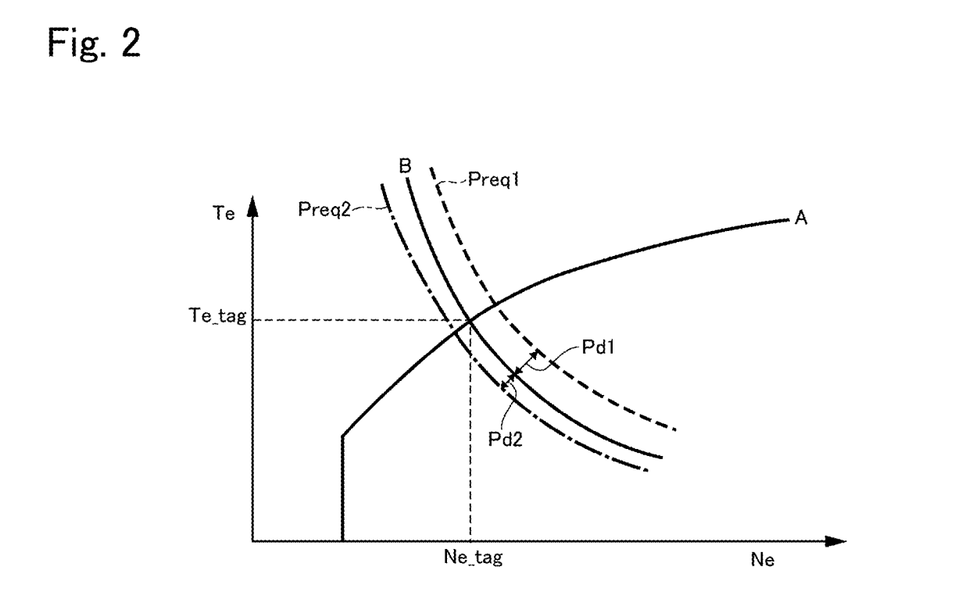
FIG. 2 is a graph indicating a relation between an engine power and a required power.

Here will be explained the operating point of the engine 1, and the drive powers and the regenerative powers of the first motor 2 and the second motor 4 with reference to FIG. 2. In FIG. 2, the horizontal axis represents the engine speed Ne, the vertical axis represents the engine torque Te, the solid curve A represents an optimum fuel efficiency curve connecting most fuel efficient points with respect to the engine speed Ne, the solid curve B represents the engine power Pe calculated by the above-explained procedures, the dashed curve A represents a first required power Preq1, and the dashed-dotted curve represents a second required power Preq2.

As can be seen from FIG. 2, the engine torque Te is controlled in such a manner that the operating point of the engine 1 is adjusted to the optimum fuel efficiency curve irrespective of the required power Preq. When the first required power Preq1 that is greater than the engine power Pe is required, at least one of the first motor 2 and the second motor 4 generates the drive power in accordance with an energy difference Pd1 between the first required power Preq1 and the engine power Pe.

By contrast, when the second required power Preq2 that is smaller than the engine power Pe is required, at least one of the first motor 2 and the second motor 4 regenerates an electric power in accordance with an energy difference Pd2 between the second required power Preq2 and the engine power Pe.

In addition to the energy consumed to propel the vehicle Ve, the electric storage device 15 has to be charged to activate auxiliaries, and the electric storage device 15 discharges electricity to prevent an overcharging. In those cases, an electric power to charge the electric storage device 15 or an electric power to be discharged from the electric storage device 15 may be added to the required power Preq that is compared to the engine power Pe to calculate the drive power to be generated by the first motor 2 and the second motor 4. However, following examples will be explained on the basis that the extra electric power to charge the electric storage device 15 or to be discharged from the electric storage device 15 is not required.

The drive power to achieve the required power Preq may be generated at least any one of the first motor 2 and the second motor 4. In the vehicle Ve, the first motor 2 is disposed upstream of a torque transmitting route to be adapted to mainly translate the engine power Pe into the electric power, and the second motor 4 is disposed downstream of the torque transmitting route to be adapted to mainly generate the drive power to propel the vehicle Ve. Therefore, in the case that the engine power Pe is greater than the required power Preq, the first motor 2 translates the excess engine power Pe into the electric power, and power exchange between the electric storage device 15 and the second motor 4 is interrupted by shutting down the second inverter 16. By contrast, in the case that the engine power Pe is smaller than the required power Preq, the second motor 4 generates the drive power, and power exchange between the electric storage device 15 and the first motor 2 is interrupted by shutting down the first inverter 14.

Figure 3:
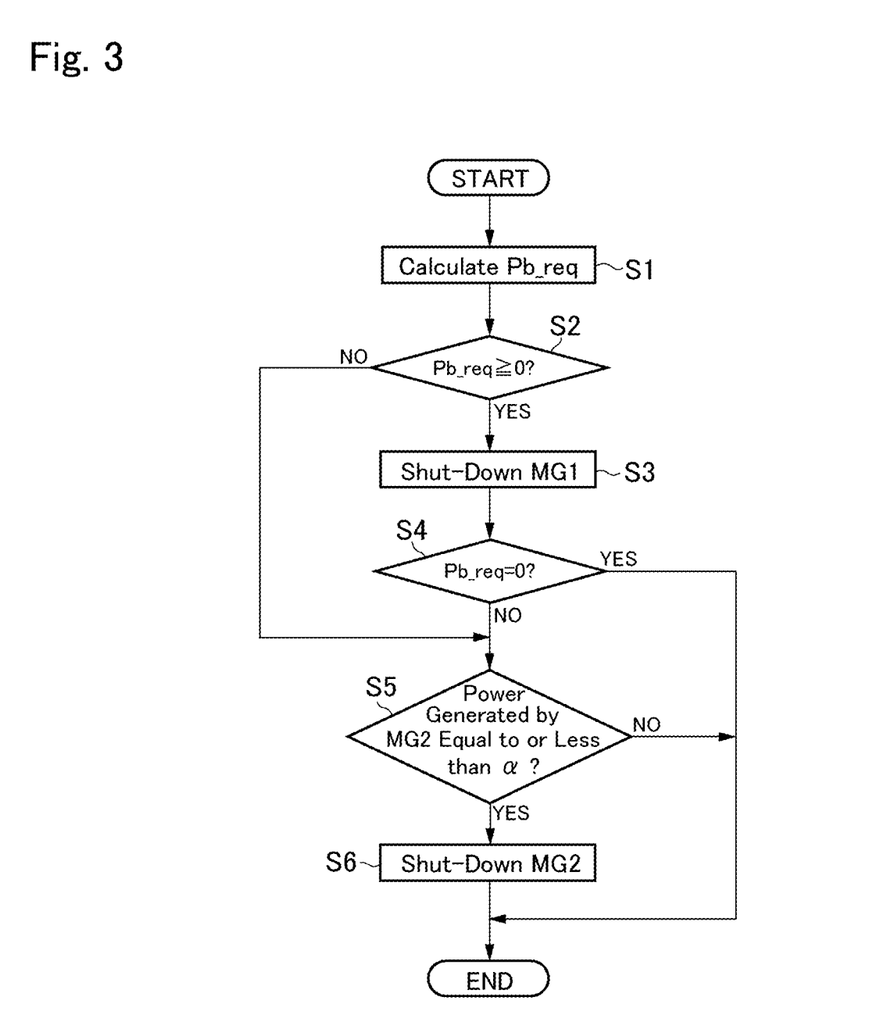
FIG. 3 is a flowchart showing an example of a routine for selecting a motor to be shut-down and a control motor.

Turning to FIG. 3, there is shown an example of a routine to select the motor to be shut-down for the purpose of reducing an energy consumption. At step S1, a required amount Pb_req of an electric power to charge the electric storage device 15 (i.e., an electromotive force) or an electric power to be discharged from the electric storage device 15 is calculated. Specifically, the required amount of the electric power to charge the electric storage device 15 or to be discharged from the electric storage device 15 corresponds to the energy difference Pd between the required power Preq and the engine power Pe. Therefore, the required amount Pb_req of the electric power to charge the electric storage device 15 or to be discharged from the electric storage device 15 may be calculated based on the vehicle speed V and the selected gear stage of the transmission 7 with reference to the map shown in FIG. 2. That is, the required amount of the electric power to charge the electric storage device 15 is an input power to the electric storage device 15, and the required amount of the electric power to be discharged from the electric storage device 15 is an output power from the electric storage device 15. Therefore, in the following explanation, the required amount of the electric power to be discharged from the electric storage device 15 will be simply expressed as a positive value of the required electric power Pb_req, and the required amount of the electric power to charge the electric storage device 15 will be simply expressed as a negative value of the required electric power Pb_req.

Then, it is determined at step S2 whether the required electric power Pb_req is equal to or greater than zero. At step S2, specifically, it is determined whether the engine 1 generates the engine power Pe greater than the required power Preq. Therefore, if the required electric power Pb_req is equal to or greater than zero so that the answer of step S2 is YES, the routine progresses to step S3 to interrupt power exchange between the first motor 2 and the electric storage device 15 so as to shut-down the first motor 2.

If the engine power Pe is equal to the required electric power Pb_req, this means that the required electric power Pb_req is zero. In this case, neither the first motor 2 nor the second motor 4 generate the drive power. Therefore, after shutting down the first motor 2 at step S3, the routine progresses to step S4 to determine whether the required electric power Pb_req is zero.

If the required electric power Pb_req is zero so that the answer of step S4 is YES, the routine returns. By contrast, if the required electric power Pb_req is not zero so that the answer of step S4 is NO, or if the required electric power Pb_req is less than zero so that the answer of step S2 is NO, this means that it is not required to generate the drive power by the second motor 4. In those cases, therefore, power exchange between the second motor 4 and the electric storage device 15 may be interrupted to shut-down the second motor 4. However, since the second motor 4 is connected to the front wheels 5, an electric power is generated by the second motor 4 if the second motor 4 is rotated at a high speed. Consequently, the electric storage device 15 may be charged unintentionally with the electric power generated by the second motor 4.

In order to avoid such disadvantage, at step S5, it is determined whether the electric power generated by the second motor 4 is equal to or less than an upper limit power a possible to be supplied to the electric storage device 15. Specifically, the electric power generated by the second motor 4 may be calculated based on a magnetic force of a permanent magnet arranged in the rotor of the second motor 4, and the upper limit power a may be set based on a specification of the second inverter 16. Instead, since the second motor 4 is rotated at a speed in accordance with the vehicle speed V, the routine shown in FIG. 3 may be modified to determine whether the vehicle speed V is equal to or lower than a first predetermined speed V1 at step S5. Accordingly, the upper limit power a corresponds to a third predetermined electric power of the embodiment of the present disclosure.

If the electric power generated by the second motor 4 is equal to or less than the upper limit power a so that the answer of step S5 is YES, the routine progresses to step S6 to interrupt power exchange between the second motor 4 and the electric storage device 15 so as to shut-down the second motor 4. By contrast, if the electric power generated by the second motor 4 is greater than the upper limit power a so that the answer of step S5 is NO, the routine returns. As a result, the shut-down of the second motor 4 is inhibited. In this case, for example, the electric power is supplied to the second motor 4 in such a manner that the second motor 4 generates a drive torque of same magnitude as a resistance torque resulting from rotating the second motor 4 passively.

Thus, in the case that the required electric power Pb_req is a positive value, that is, in the case that the drive power of the second motor 4 has to be added to the engine power Pe to achieve the required power Preq, the first motor 2 is shut-down. In this case, therefore, the first motor 2 adapted mainly to regenerate electric power rather than generating drive power will not be driven. For this reason, an electrical power loss as might be caused by operating the first motor 2 may be reduced. In this case, the second motor 4 is selected as an after-mentioned control motor to generate the drive power to achieve the required power Preq.

By contrast, in the case that the required electric power Pb_req is a negative value, that is, in the case that the excess engine power Pe has to be translated into the electric power and that the electric power generated by the second motor 4 is equal to or less than the upper limit power a, the second motor 4 is shut-down. In this case, therefore, the second motor 4 adapted mainly to generate drive power will not regenerate electric power. For this reason, an electrical power loss as might be caused by operating the second motor 4 may be reduced. In this case, the first motor 2 is selected as the after-mentioned control motor to regenerate the electric power to achieve the required power Preq. That is, the routine shown in FIG. 3 is configured to select the motor to be shut-down, and to select the control motor to be controlled to operate the engine 1 at the most fuel efficient point.

In addition, in the case that the electric power generated by the second motor 4 is greater than the upper limit power a, the shut-down of the second motor 4 is inhibited. In this case, therefore, the electric power will not be supplied unintentionally to the electric storage device 15 and hence damage to the electric storage device 15 may be limited.

Instead, the motor to be shut-down and the control motor may also be selected with reference to a two-dimensional map for determining the motor to be shut-down in each operating region based on the vehicle speed V and the required drive force Freq.

Thus, the motor to be shut-down and the control motor are selected by executing the routine shown in FIG. 3, and the control motor is driven to adjust the operating point of the engine 1 to the most fuel efficient point. In this situation, although the thermal efficiency of the engine 1 is improved, an energy loss is caused inevitably as a result of driving the first motor 2 and the second motor 4. Consequently, an energy loss resulting from driving the engine 1, the first motor 2, and the second motor 4 may be increased greater than an energy loss of a case in which the required power Preq is generated only by the engine 1.

For example, if there is a slight difference between the required power Preq and the engine power Pe of the case in which the engine 1 is operated at the most fuel efficient point, the first motor 2 and the second motor 4 are activated. In this situation, an energy loss is caused as a result of energy conversion between a mechanical energy and an electric energy. Hereinafter, such energy loss resulting from the energy conversion will be called the first energy loss.

In the case of generating the required power Preq only by the engine 1, the operating point of the engine 1 may be deviated from the most fuel efficient point. In this case, an energy loss is increased as compared to the case in which the engine 1 is operated at the most fuel efficient point. Hereinafter, such energy loss resulting from operating the engine 1 at the point different from the most fuel efficient point will be called the second energy loss.

Thus, the first energy loss and the second energy loss are caused for different reasons, and the first energy loss is likely increased greater than the second energy loss with a reduction in the difference between the required power Preq and the and the engine power Pe. If the first motor 2 or the second motor 4 is driven in this situation, a total energy loss in the vehicle Ve will be increased.

In order to avoid such increase in the total energy loss in the vehicle Ve, the control system according to the exemplary embodiment of the present disclosure is configured to shut-down the control motor driven to adjust the operating point of the engine 1 to the most fuel efficient point depending on a required electric power to energize the control motor, or an electric power to be generated by the control motor. As described, the second motor 4 is selected as the control motor in the case that the first motor 2 is shut-down at step S3 of the routine shown in FIG. 3, and the first motor 2 is selected as the control motor in the case that the second motor 4 at step S6 of the routine shown in FIG. 3.

Figure 4:
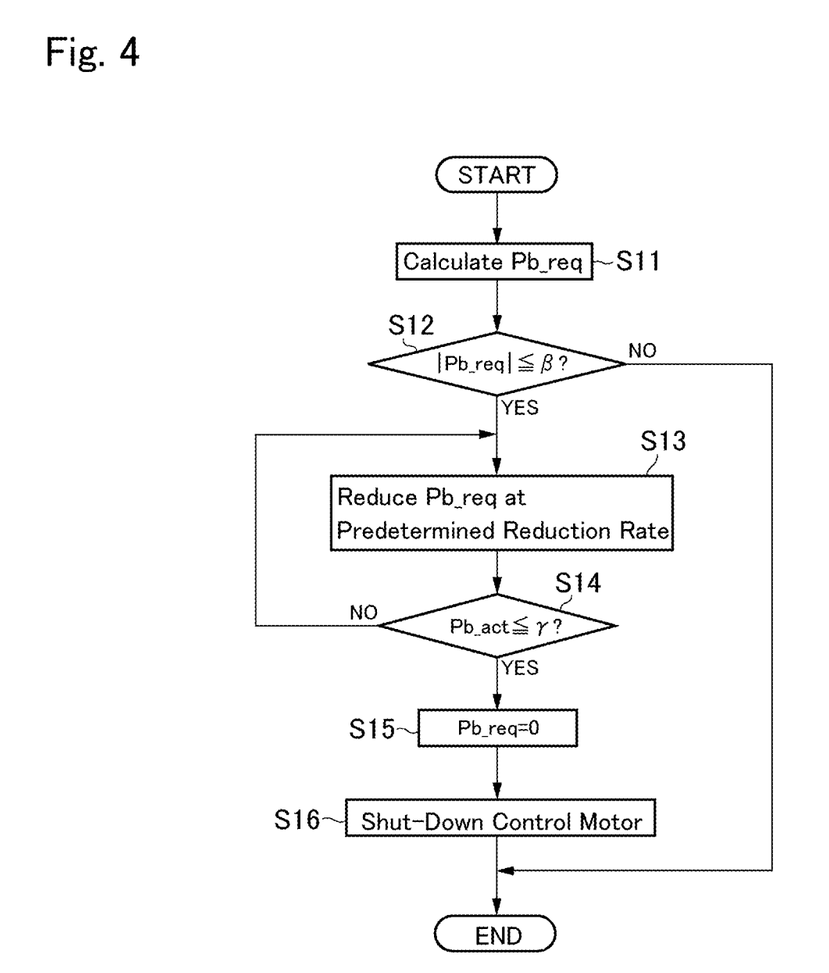
FIG. 4 is a flowchart showing an example of a routine for shutting down the control motor based on a required electric power.

To this end, the control system according to the exemplary embodiment of the present disclosure executes the routine shown in FIG. 4. First of all, at step S11, the required electric power Pb_req is calculated by the same procedures as step S1 of the routine shown in FIG. 3.

Then, it is determined at step S12 whether an absolute value of the required electric power Pb_req is equal to or less than a threshold value ß as a first predetermined electric power. For example, the threshold value ß is set within a range in which a driver will not feel any uncomfortable feeling due to deficiency and excess of the engine power Pe with respect to the required power Preq, even if the drive power is generated only by the engine 1 without driving the control motor. Instead, the threshold value ß may also be set to a value at which the first energy loss exceeds the second energy loss.

In a case that the absolute value of the required electric power Pb_req is greater than the threshold value ß so that the answer of step S12 is NO, the driver may feel uncomfortable feeling due to deficiency and excess of the engine power Pe with respect to the required power Preq unless the control motor is driven. Otherwise, the energy loss may be increased due to deviation of the operating point of the engine 1 from the most fuel efficient point unless the control motor is driven. In this case, therefore, the routine returns. Consequently, the required electric power Pb_req is suppled from the electric storage device 15 to the control motor, or the required electric power Pb_req is generated by the control motor to charge the electric storage device 15. By contrast, if the absolute value of the required electric power Pb_req is equal to or less than the threshold value ß so that the answer of step S12 is YES, the routine progresses to step S13 to execute a control to shut-down the control motor.

In order to reduce a shock as might be generated by shutting down the control motor, at step S13, the required electric power Pb_req is reduced at a predetermined reduction rate. Since the rotational speed of the control motor is governed by the vehicle speed V, the output torque of the control motor is reduced with a reduction in the required electric power Pb_req. In order to calculate the predetermined reduction rate of the required electric power Pb_req, therefore, a change rate of the drive torque at which the driver will not feel uncomfortable feeling is calculated, and a change rate of the output torque of the control motor is calculated in accordance with a change in the drive torque changed at the calculated change rate of the drive torque. Then, the predetermined reduction rate of the required electric power Pb_req is set in accordance with the change rate of the output torque of the control motor. Here, the change rate of the drive torque at which the drive will not feel uncomfortable feeling may be changed depending on the vehicle speed V and so on. Therefore, the predetermined reduction rate of the required electric power Pb_req employed at step S13 may be a variable rate.

Then, it is determined at strep S14 whether an actual electric power supplied to the control motor or an actual electric power generated by the control motor (as will be called the "actual electric power Pb_act" hereinafter) is equal to or less than a threshold value γ as a second predetermined electric power. Specifically, the threshold value γ is set to a value at which the driver will not sense a change in the drive force even if the electric power supplied to the control motor or the electric power generated by the control motor is reduced stepwise to zero. If an absolute value of the actual electric power Pb_act is equal to or less than the threshold value γ so that the answer of step S14 is YES, the routine progresses to step S15 to set the required electric power Pb_req to zero. Then, at step S16, the control motor is shut-down, and thereafter the routine returns.

By contrast, if the absolute value of the actual electric power Pb_act is greater than the threshold value γ so that the answer of step S14 is YES, the routine returns to step S13 to further reduce the required electric power Pb_req at the predetermined reduction rate until the absolute value of the actual electric power Pb_act is reduced to the threshold value γ.

By thus shutting down the control motor after reducing the actual electric power Pb_act, only the engine power Pe is delivered to the drive wheels. Consequently, an actual drive power to propel the vehicle Ve may be increased greater than the required power Preq or reduced less than the required power Preq. However, as described, the control motor is shut-down only in the case that the required electric power Pb_req is less than the threshold value ß set within the range in which the driver will not feel any uncomfortable feeling, even if the drive power is generated only by the engine 1 without driving the first motor and the second motor 4. For this reason, the driver will not feel any uncomfortable feeling.

Optionally, in order to reduce the difference between the required power Preq and the actual drive power to propel the vehicle Ve resulting from shutting down the control motor, the engine power Pe may be varied in accordance with the required power Preq. That is, the engine 1 may be operated at the operating point slightly deviated from the optimum fuel efficiency curve so as to control the torque of the engine 1 to achieve the required power Preq.

Thus, in order to reduce the shock as might be generated by shutting down the control motor, the required electric power Pb_req is reduced at the predetermined reduction rate in the case that the required electric power Pb_req is equal to or less than the threshold value ß, and then the control motor is shut down. However, according to the exemplary embodiment of the present disclosure, the control motor may also be shut-down when the required electric power Pb_req is reduced less than the threshold value ß.

Figure 5:
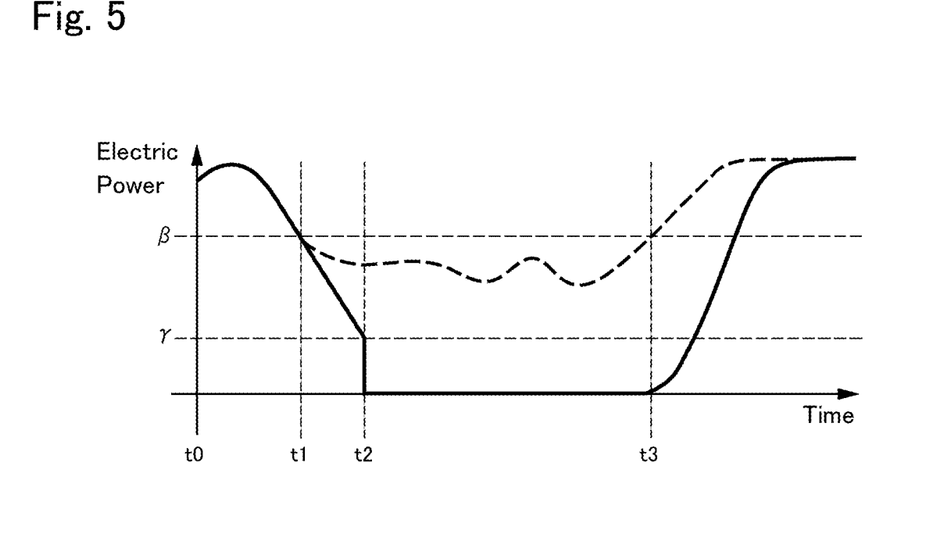
FIG. 5 is a time chart showing a temporal change in the electric power supplied to the control motor during execution of the routine shown in FIG. 4.

Turning to FIG. 5, there is shown a temporal change in the electric power supplied to the control motor during execution of the routine shown in FIG. 4. Here, since the control response of the motor is satisfactory quick, the actual electric power Pb_act is substantially equal to the required electric power Pb_req. In the time chart shown in FIG. 5, therefore, the actual electric power Pb_act and the required electric power Pb_req are represented by the common curve.

At point to, the required electric power Pb_req is a positive value, and hence the electric power is supplied to the second motor 4 to generate the drive power. In this situation, the required electric power Pb_req is still greater than the threshold value ß, the routine shown in FIG. 4 returns from step S12. In this situation, therefore, the required electric power Pb_req is set to a value possible to generate the drive power to compensate the difference Pd between the required power Preq and the engine power Pe.

At point t1, the required electric power Pb_req is reduced to be equal to or less than the threshold value ß so that the routine shown in FIG. 4 progresses from step S12 to S13 to reduce the required electric power Pb_req at the predetermined reduction rate. In FIG. 5, the dashed curve indicates one example of a change in a theoretical value of the difference Pd between the required power Preq and the engine power Pe after point t1.

As a result of reducing the required electric power Pb_req, at point t2, the actual electric power Pb_act falls below the threshold value γ. In this situation, therefore, the routine shown in FIG. 4 progresses from step S14 to steps S15 and S16 sequentially to shut-down the control motor (i.e., the second motor 4).

At point t3, the theoretical value of the difference Pd between the required power Preq and the engine power Pe exceeds the threshold value ß. Consequently, in order to operate the control motor being shut-down to generate the electric power in accordance with the difference Pd between the required power Preq and the engine power Pe, an actual required electric power Pb_req is increased gradually from point t3.

As described, in the case that the required electric power Pb_req is equal to or less than the threshold value ß, the total energy loss in the vehicle Ve may be reduced by shutting down the control motor. In other words, an operating region where a power supply to/from the electric storage device 15 is stopped can be expanded. For this reason, the energy loss resulting from exchanging power between the electric storage device 15 and the first motor 2 or the second motor 4 can be reduced. In addition, by thus reducing the required electric power Pb_req at the predetermined reduction rate in the case that the required electric power Pb_req is equal to or less than the threshold value ß, the shock as might be generated by shutting down the control motor can be reduced, and the control motor can be shut-down more frequently. For these reasons, the total energy loss of the vehicle Ve can be reduced.

According to the example shown in FIG. 3, the motor suitable to meet the demand is selected as the control motor depending on whether the required power Preq is greater than the engine power Pe, that is, depending on whether the electric storage device 15 discharges the electric power. On the other hand, the other motor that is not suitable to meet the demand is shut-down irrespective of whether the control motor is shut-down.

An operating point of each of the first motor 2 or the second motor 4 is governed by an output torque and a rotational speed thereof. That is, a conversion efficiency of each of the first motor 2 and the second motor 4 to translate an input electric power into a mechanical power may be varied depending on the operating point. In addition, the first motor 2 is connected to the pair of rear wheels 3 through the transmission 7, on the other hand, the second motor 4 is connected to the pair of front wheels 5 through the reduction gear pair 11. For these reasons, a relation between the first motor 2 and the second motor 4 may be changed depending on the speed ratio of the transmission 7. As a result, an electrical power loss resulting from driving the first motor 2 may be reduced smaller than an electrical power loss resulting from driving the second motor 4.

Further, different members are interposed between the first motor 2 and the pair of rear wheels 3, and between the second motor 4 and the pair of front wheels 5. That is, a mechanical power loss caused in a power transmission path between the first motor 2 and the pair of rear wheels 3 and a mechanical power loss caused in a power transmission path between the second motor 4 and the pair of front wheels 5 may be different from each other.

The above-mentioned electrical power loss as well as mechanical power loss may be changed depending on various conditions such as the vehicle speed, the required drive force, the speed ratio of the transmission 7 and so on. According to the exemplary embodiment, therefore, the control system is further configured to execute a routine shown in FIG. 6 to select the motor to be shut-down and the control motor taking account of the mechanical power loss and the mechanical power loss.

Figure 6:
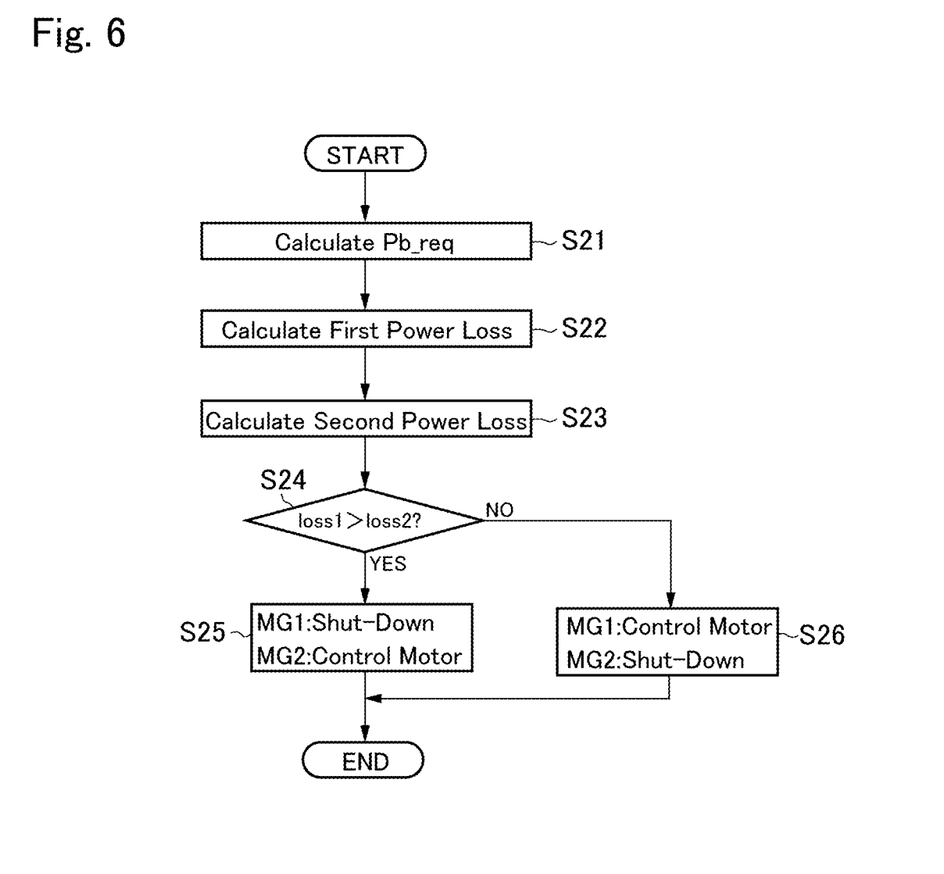
FIG. 6 is a flowchart showing an example of a routine for selecting the motor to be shut-down and the control motor based on a power loss.

First of all, at step S21, the required electric power Pb_req is calculated by the same procedures as step S1 of the routine shown in FIG. 3. Then, the routine progresses to step S22 to calculate a first power loss L1 as a total value of: an electrical power loss as might be caused by supplying the required electric power Pb_req to the first motor 2; and a mechanical power loss as might be caused by generating a mechanical power by the first motor 2 by supplying the required electric power Pb_req to the first motor 2. For example, the electrical power loss of the first motor 2 includes a loss resulting from converting direct current electricity into alternating current electricity by the first inverter 14, a copper loss in a coil wound around the stator of the first motor 2 resulting from supplying the electric power to the first motor 2, and an iron loss resulting from rotating the rotor of the first motor 2. On the other hand, the mechanical power loss of the first motor 2 includes a friction loss between gears of the transmission 7 and the rear differential gear unit 9.

The routine further progresses to step S23 to calculate a second power loss L2 as a total value of: an electrical power loss as might be caused by supplying the required electric power Pb_req to the second motor 4; and a mechanical power loss as might be caused by generating a mechanical power by the second motor 4 by supplying the required electric power Pb_req to the second motor 4. For example, the electrical power loss of the second motor 4 includes a loss resulting from converting direct current electricity into alternating current electricity by the second inverter 16, a copper loss in a coil wound around the stator of the second motor 4 resulting from supplying the electric power to the second motor 4, and an iron loss resulting from rotating the rotor of the second motor 4. On the other hand, the mechanical power loss of the second motor 4 includes a friction loss between gears of the reduction gear pair 11 and the front differential gear unit 13.

Then, it is determined at step S24 whether the first power loss L1 is greater than the second power loss L2. If the first power loss L1 is greater than the second power loss L2 so that the answer of step S24 is YES, the routine progresses to step S25 to shut-down the first motor 2 and to select the second motor 4 as the control motor. Thereafter, the routine returns. By contrast, if the first power loss L1 is less than the second power loss L2 so that the answer of step S24 is NO, the routine progresses to step S26 to select the first motor 2 as the control motor and to shut-down the second motor 4. Thereafter, the routine returns.

As described, the speed ratio (or the gear stage) of the transmission 7, the required power Preq, the engine power Pe, and the required electric power Pb_req may be calculated based on the vehicle speed V and the required drive force Freq. The above-explained first power loss L1 and second power loss L2 may also be calculated those values and an electrical resistance of the motor and friction coefficients of the gears. Therefore, in order to select the motor to be shut-down and the control motor, a two-dimensional map for determining the motor to be shut-down and the control motor in each operating region based on the vehicle speed V and the required drive force Freq may be installed in the ECU 17.

Thus, the first power loss L1 of the first motor 2 and the second power loss L2 of the second motor 4 are compared to each other, and one of the motors whose power loss is smaller than the other one is selected as the control motor. For this reason, an energy loss can be further reduced when generating the drive power to compensate for the difference Pd between the required power Preq and the engine power Pe.

Although the above exemplary embodiments of the present invention have been described, it will be understood by those skilled in the art that the present disclosure should not be limited to the described exemplary embodiments, and various changes and modifications can be made within the scope of the present disclosure. For example, the drive force control system according to the exemplary embodiment of the present discourse may also be applied to a vehicle in which the second motor 4 is disposed downstream of the transmission 7, or a vehicle having only one of the first motor 2 and the second motor 4.

What is claimed is:

1. A drive force control system for a hybrid vehicle, the drive force control system comprising:
   an engine;
   a transmission connected to an output section of the engine, in which a gear stage is selected from a plurality of gear stages;
   a control motor having a generating function that is connected to any one of a pair of wheels to which a torque is delivered from the transmission and another pair of wheels;
   an electric storage device that is connected to the control motor;
   an inverter that interrupts power exchange between the control motor and the electric storage device; and
   a controller that controls the engine and the control motor, wherein
   the controller is configured to
      calculate an output power of the engine which can optimize a thermal efficiency of the engine given that the engine is operated at a speed determined based on a speed ratio of the transmission and a speed of the hybrid vehicle,
      calculate a required electric power to be supplied from the electric storage device or to be generated by the control motor, which can adjust a drive power to propel the hybrid vehicle established by the calculated output power of the engine to a required power to propel the hybrid vehicle, and
      control the inverter to interrupt the power exchange between the control motor and the electric storage device if the required electric power to be supplied from the electric storage device or to be generated by the control motor is equal to or less than a first predetermined electric power.

2. The drive force control system for the hybrid vehicle as claimed in claim 1, wherein the first predetermined electric power is set to a value at which an energy loss of the control motor resulting from supplying the required electric power from the electric storage device to the control motor or generating the required electric power by the control motor is increased greater than another energy loss resulting from operating the engine to generate the output power to achieve the required power to propel the hybrid vehicle.

3. The drive force control system for the hybrid vehicle as claimed in claim 1, wherein the controller is further configured to
   reduce the required electric power to be supplied from the electric storage device or to be generated by the control motor at a predetermined reduction rate, if the required electric power to be supplied from the electric storage device or to be generated by the control motor is equal to or less than the first predetermined electric power, and interrupt the power exchange between the control motor and the electric storage device by reducing the required electric power to be supplied from the electric storage device or to be generated by the control motor to zero, after the required electric power to be supplied from the electric storage device or to be generated by the control motor is reduced to be equal to or less than a second predetermined electric power.

4. The drive force control system for the hybrid vehicle as claimed in claim 1, wherein the hybrid vehicle comprises a first motor connected to an input section of the transmission, and a second motor connected to an output section of the transmission or to said another pair of wheels, and the controller is further configured to select any one of the first motor and the second motor as the control motor.

5. The drive force control system for the hybrid vehicle as claimed in claim 4, wherein the controller is further configured to select the first motor as the control motor in a case that the required power to propel the hybrid vehicle is less than the output power of the engine, and select the second motor as the control motor in a case that the required power to propel the hybrid vehicle is greater than the output power of the engine.

6. The drive force control system for the hybrid vehicle as claimed in claim 4, wherein the controller is further configured to calculate a first power loss as a total value of: an electrical power loss as might be caused by supplying the required electric power to the first motor from the electric storage device or generating the required electric power by the first motor; and a mechanical power loss as might be caused by delivering a mechanical power generated by the first motor to the pair of wheels to which the torque is delivered from the transmission, calculate a second power loss as a total value of: another electrical power loss as might be caused by supplying the required electric power to the second motor from the electric storage device or generating the required electric power by the second motor; and another mechanical power loss as might be caused by delivering another mechanical power generated by the second motor to any one of the pair of wheels and said another pair of wheels to which further torque is delivered from the second motor, select the first motor as the control motor in a case that the first power loss is less than the second power loss, and select the second motor as the control motor in a case that the first power loss is greater than the second power loss.

7. The drive force control system for the hybrid vehicle as claimed in claim 4, wherein the controller is further configured to interrupt the power exchange between the other one of the first motor and the second motor and the electric storage device, irrespective of whether the power is exchanged between the control motor and the electric storage device.

8. The drive force control system for the hybrid vehicle as claimed in claim 4, wherein the controller is further configured to inhibit interruption of the power exchange between the second motor and the electric storage device, in a case that an electric power generated by the second motor is greater than a third predetermined electric power.

* * * * *